United States Patent [19]
Zimmerman et al.

[11] Patent Number: 4,686,107
[45] Date of Patent: * Aug. 11, 1987

[54] SWEETENER COMPOSITION AND METHOD

[76] Inventors: Garyx Zimmerman, 2005 Pinehurst Rd., Los Angeles, Calif. 90068; Donald E. Dickenson, 960 Larrabee St., Los Angeles, Calif. 90069

[ * ] Notice: The portion of the term of this patent subsequent to Jan. 28, 2003 has been disclaimed.

[21] Appl. No.: 822,609

[22] Filed: Jan. 27, 1986

Related U.S. Application Data

[63] Continuation-in-part of Ser. No. 730,479, May 6, 1985, Pat. No. 4,567,054.

[51] Int. Cl.$^4$ .............................................. A23L 1/22
[52] U.S. Cl. ................................................. 426/548
[58] Field of Search ...................................... 426/548

[56] References Cited

U.S. PATENT DOCUMENTS

| | | | |
|---|---|---|---|
| 113,617 | 4/1871 | Bates | 426/548 X |
| 3,476,571 | 11/1969 | Block et al. | 426/548 |
| 4,153,737 | 5/1979 | Berg et al. | 426/548 |
| 4,254,155 | 3/1981 | Dwivedi et al. | 426/548 |
| 4,567,054 | 1/1986 | Zimmerman et al. | 426/548 |

OTHER PUBLICATIONS

Hawley, The Condensed Chemical Dictionary, 10th Ed., 1981, Van Nostrand Reinhold Co.: New York, pp. 502-504.
Stecher et al., The Merck Index, 8th Ed., 1968, Merck & Co., Inc.: Rahway, N.J. pp. 2-3, 499, 500.
Bennett, Substitutes, 1943, Chemical Publishing Co., Inc.: Brooklyn, NY, pp. 120-124.

*Primary Examiner*—Joseph Golian
*Attorney, Agent, or Firm*—Kenyon & Kenyon

[57] ABSTRACT

A sweetener composition comprising glycerol, glycine and gum arabic is adapted for use as a sugar substitute and is advantageously employed in the preparation of low carbohydrate foods and beverages. The sweetener composition, which contains from about 92 to about 98 wt. % glycerol, from about 0.5 to about 3.0 wt. % glycine and from about 1.5 to about 5.0 wt. % gum arabic, can be prepared by heating and stirring a mixture of these ingredients to obtain a solution of the same.

12 Claims, No Drawings

SWEETENER COMPOSITION AND METHOD

CROSS-REFERENCE TO RELATED APPLICATION

This application is a continuation-in-part of U.S. patent application Ser. No. 730,479, filed May 6, 1985 and entitled Sweetener Composition, now U.S. Pat. No. 4,567,054 dated Jan. 28, 1986.

BACKGROUND OF THE INVENTION

This invention relates to sweetener compositions and, more particularly, to sweetener compositions that are adapted to be used as a sugar substitute.

Certain people require low carbohydrate diets as a result of their metabolic sensitivity to carbohydrate. However, these people have difficulty maintaining the prescribed or recommended diet because of the taste characteristics and limited selection of low carbohydrate foods. Thus, there is a need for a nutritive, substantially non-carbohydrate, non-artificial sweetener which can be utilized to improve the taste and other organoleptic properties of low carbohydrate foods and beverages so as to make such foods and beverages more palatable to persons on a limited carbohydrate diet.

SUMMARY OF THE INVENTION

In accordance with one aspect of this invention, there is provided a sweetener composition comprising from about 92 to about 98 wt. % glycerol, from about 0.5 to about 3.0 wt. % glycine and from about 1.5 to about 5.0 wt. % gum arabic.

In accordance with a second aspect of this invention, there is provided a method for preparing a sweetener composition, which comprises:

heating and stirring a mixture containing from about 92 to about 98 wt. % glycerol, from about 0.5 to about 3.0 wt. % glycine, and from about 1.5 to about 5.0 wt. % gum arabic at a temperature from about 90° to about 115° C. to obtain a solution of said glycine and said gum arabic in said glycerol.

DETAILED DESCRIPTION

The compositions of this invention comprise glycerol, glycine and gum arabic. Glycerol is a colorless, odorless, viscous liquid with a sweet taste that is characterized as being about 0.6 times as sweet as cane sugar. The term "glycerol" as used herein refers to the USP grade which is water-white and suitable for use in foods or other products intended for human consumption. Glycerol, as a result of its humectant properties, is an important moistening agent for baked goods and is added to candies and icings to prevent crystallization. In addition, it is used as a solvent and carrier for extracts and flavoring agents and as a solvent for food color. Glycerol is generally present in the compositions of this invention in an amount from about 92 to about 98 wt. % and, preferably, in an amount from about 95 to about 97 wt. %.

Glycine, which is chemically identified as aminoacetic acid, is available in the form of white, very sweet, odorless crystals. Its uses are reported to include nutrient and dietary supplement, and feed additive. The literature discloses that glycine is insoluble in alcohol and ether, but soluble in water. Glycine is generally present in the compositions of this invention in an amount from about 0.5 to about 3.0 wt. % and, preferably, from about 0.5 to about 1.5 wt. %.

Gum arabic, a commercial term for acacia gum, is the dried gummy exudate from the stems of acacia Senegal or related African species of acacia. Various grades of this gum are available including Senegal, Kordofan, Morocco, Cape, Aden, suakin, and white Senaar. Kordofan gum is preferred for food preparation since it is clear, white and tasteless. Gum arabic, which may be in the form of thin flakes, powder, granules, or angular fragments, is a complex and highly branched carbohydrate polymer having an estimated molecular weight from about 250,000 to about 300,000 or more. The central core or nucleus is D-galactose and D-glucuronic acid (calcium, magnesium and potassium salts) to which are attached sugars such as L-arabinose and L-rhamnose. While gum arabic is insoluble in ethanol, it is soluble in glycerol and propylene glycol. However, it is noted in the literature that prolonged heating of several days may be necessary for complete solution of gum arabic in glycerol at 5% concentration. Gum arabic is used in foods as a stabilizer and thickener. It forms viscous solutions which prevent aggregation of the small particles of the dispersed phase. Gum arabic solutions also retard crystal growth in ice cream (ice crystals) and in confections (sugar crystals). Gum tragacanth, like gum arabic, is classified as a plant exudate but, unlike gum arabic, it has been found that gum tragacanth is insoluble in glycerol and, therefore, is not suitable for use in the compositions herein. Gum arabic is generally present in the compositions of this invention in an amount from about 1.5 to about 5.0 wt. % and, preferably, in an amount from about 2.0 to about 4.0 wt. %. The concentration of gum arabic must be selected within the designated range where a fluid sweetener is desired.

The sweetener composition can be prepared by (a) heating and stirring a first mixture containing at least about 16 parts by weight of glycerol per 1.0 part by weight of glycine at a temperature from about 90° to about 115° C. and, preferably, at a temperature from about 93° to about 110° C. to obtain a solution of glycine and glycerol, (b) heating and stirring a second mixture containing at least about 8.8 parts by weight of glycerol per 1.0 part by weight of gum arabic at a temperature from about 90° to about 115° C. and, preferably, at a temperature from about 93° to about 110° C. to obtain a solution of gum arabic in glycerol, and (c) blending the glycerol solution of glycine with the glycerol solution of gum arabic at a temperature from about ambient temperature to about 115° C. to produce the finished product. Neither glycine nor gum arabic is soluble in glycerol at ambient temperature and at the concentrations described herein. However, it has been found that solubilization of glycine and gum arabic in glycerol can be readily effected at elevated temperatures in the range from about 90° to about 115° C. For small batches, it has been observed that the time of heating, in the specified temperature range, for converting glycerol suspensions of glycine and gum arabic to solution form usually does not exceed about 10 minutes. Any suitable mixing vessel can be used for preparing the solutions such as a steam jacketed kettle. The concentration of ingredients employed in the process is so selected that the resulting sweetener composition comprises: from about 92 to about 98 wt. % and, preferably, from about 95 to about 97 wt. % glycerol; from about 0.5 to about 3.0 wt. % and, preferably, from about 0.5 to about 1.5 wt. % glycine; and from about 1.5 to about 5.0 wt. % and, preferably, from about 2.0 to about 4.0 wt. % gum arabic.

EXAMPLE I

A series of 100 gram batches of sweetener composition were prepared with each sweetener composition containing 96 grams of glycerol, 1.0 gram of glycine and 3.0 grams of gum arabic. Each composition was prepared in the following manner. One (1) gram of glycine was admixed with 48 grams of glycerol to form a suspension which, with continuous stirring, was heated to and maintained at a temperature between 105° and 110° C. for about 10 minutes to effect solubilization of the glycine in the glycerol, whereupon heating was discontinued. Forty-eight (48) grams of glycerol were slowly added to and admixed with 3 grams of gum arabic to form a suspension which, with continuous stirring, was heated to and maintained at a temperature between 105° and 110° C. for about 5 minutes to effect solubilization of the gum arabic in the glycerol, whereupon heating was discontinued. The glycerol solution of glycine was then added to and blended with the glycerol solution of gum arabic to obtain the sweetener composition.

A sample of the sweetener composition and unmodified glycerol were compared and evaluated for taste characteristics. It was noted that while glycerol produces a sweet taste, it has a biting, stinging or irritating effect in the mouth which may arise from its humectant properties. In contrast to unmodified glycerol, the sweetener compositions of this invention produce a pleasant taste in the mouth which is not biting, stinging or irritating. Also, the sweetener compositions have a higher viscosity than plain glycerol which appears to improve the overall characteristics of the compositions.

The sweetener compositions in Examples 1a through 1e contain 96 grams of glycerol, 1.0 gram of glycine and 3.0 grams of gum arabic.

1a

A low carbohydrate cheesecake was prepared by mixing the following ingredients in a blender and pouring the admixture into a baking casserole dish and baking the contents for 1.0 hour at 300° F.

| INGREDIENTS | QUANTITY |
| --- | --- |
| Raw Cream | 1 Cup |
| Ricotta Cheese | 32 Ounces |
| Eggs | 6 Each |
| Sweetener Composition | 6 Tablespoons |
| Lemon Juice | 2 Tablespoons |
| Lemon Extract | ¼ Teaspoon |
| Vanilla | 1 Teaspoon |

The resulting cheesecake was tasted and evaluated. It was noted that the sweetness and texture of the cheesecake prepared with the sweetener composition of this invention corresponded favorably with cheesecake prepared with sucrose as the sweetening agent.

1b

This example illustrates a recipe for a loaf of bread that incorporates the sweetener composition of this invention.

| INGREDIENTS | QUANTITY |
| --- | --- |
| Egg Yolks | 8 Each |
| Sweetener Composition | 2 Tablespoons |
| Walnuts, Pulverized | 1 Cup |
| Sunflower Seeds, Pulverized | 1 Cup |
| Soy Flour (full fat only) | ¼ Cup |
| Salt Substitute | ¼ Teaspoon |
| Baking Powder | ¼ Teaspoon |
| Egg Whites | 8 Each |
| Olive Oil (To oil baking pan) | |

1c

This example illustrates a recipe for chocolate cake a paulo which incorporates the sweetener composition of this invention.

| INGREDIENTS | QUANTITY |
| --- | --- |
| Pecans, Halves or Pieces | 6-7 Ounces |
| Soy Flour (full fat) | ¼ Cup |
| Egg Whites | 8 Each |
| Egg Yolks | 8 Each |
| Vanilla Extract | 1 Teaspoon |
| Baker's Chocolate, Unsweetened | 2 Ounces |
| Sweetener Composition | ¾ Cup |
| Butter, for baking pan | 2-3 Teaspoons |

1d

This example illustrates a basic ice cream recipe that incorporates the sweetener composition of this invention.

| INGREDIENTS | QUANTITY |
| --- | --- |
| Cream Cheese | 6 Ounces |
| Raw Heavy Cream, All-purpose | 3 Cups |
| Vanilla Extract | 1 Tablespoon |
| Sweetener Composition | ¼ Cup |
| Egg Yolks, Optional | 2 Each |

1e

This example illustrates a recipe for carbonated beverage that incorporates the sweetener composition of this invention.

| INGREDIENTS | QUANTITY |
| --- | --- |
| Carbonated Water | 4 Ounces |
| Sweetener Composition | 1 Teaspoon |
| Grape Concentrate | 1 Teaspoon |

EXAMPLE II

This example illustrates recipes that incorporate a sweetener composition containing 97.5 wt. % glycerol, 0.5 wt. % glycine and 2.0 wt. % gum arabic.

2a

This example illustrates the use of the sweetener composition in a salad dressing.

| INGREDIENTS | QUANTITY |
| --- | --- |
| Tomato Sauce | 15 Ounces |
| Prepared Mustard | 2 Tablespoons |
| Mayonnaise | ½ Cup |
| Olive Oil | 1 Tablespoon |
| Lemon Juice | 2 Tablespoons |

| INGREDIENTS | QUANTITY |
| --- | --- |
| Water | 2 Tablespoons |
| Sweetener Composition | 1 Tablespoon |
| Curry Powder | ½ Tablespoon |

2b

This example illustrates the use of the sweetener composition in a Thousand Island Dressing.

| INGREDIENTS | QUANTITY |
| --- | --- |
| Stuffed Green Olives, Chopped | ¼ Cup |
| Green Peppers, Chopped Fine | 2 Tablespoons |
| Onion, Chopped Fine | 2 Tablespoons |
| Garlic Powder | 1 Teaspoon |
| Mayonnaise | 1 Cup |
| Tomato Paste | 2 Tablespoons |
| Cream | ¼ Cup |
| Sweetener Composition | To Taste |

2c

This example illustrates the use of the sweetener composition in French Dressing.

| INGREDIENTS | QUANTITY |
| --- | --- |
| Olive Oil | ½ Cup |
| Tarragon Vinegar | 2 Tablespoons |
| Dijon Mustard | 2 Teaspoons |
| Tomato Paste | 1 Tablespoon |
| White Pepper | ½ Teaspoon |
| Paprika | ½ Teaspoon |
| Onion, Finely Chopped | 1 Tablespoon |
| Garlic Powder | 1 Teaspoon |
| Sweetener Composition | To Taste |

EXAMPLE III

This example illustrates recipes that incorporate a sweetener composition containing 92 wt. % glycerol, 3.0 wt. % glycine and 5.0 wt. % gum arabic.

3a

This example illustrates the use of the sweetener composition in tomato Catsup.

| INGREDIENTS | QUANTITY |
| --- | --- |
| Tomato Puree | 2 Cups |
| Tomato Juice | 2 Cups |
| Cider Vinegar | 1 Cup |
| Sweetener Composition | ½ Cup |
| Dry Mustard | 1 Teaspoon |
| Celery, Diced Stalks & Leaves | 2 Each |
| Onions, Diced | 2 Each |
| Salt Substitute | ¾ Teaspoon |

3b

This example illustrates the use of the sweetener composition in barbeque sauce.

| INGREDIENTS | QUANTITY |
| --- | --- |
| Tomato Paste | 15 Ounces |
| Water | ½ Cup |
| Onion, Finely Minced | ½ Cup |
| Dry Mustard | 3 Teaspoons |

| INGREDIENTS | QUANTITY |
| --- | --- |
| Dijon Mustard | 1 Teaspoon |
| Red Wine Vinegar | 3 Tablespoons |
| Soy Sauce (salt free) | 2 Tablespoons |
| Lemon | ½ Each (Juice) |
| Tobasco | ½ Teaspoon |
| Garlic Posder | 1 Teaspoon |
| Sweetener Composition | 4 Teaspoons |

It has been observed that other amino acids cannot be substituted for glycine in the sweetener compositions of this invention. Alanine, aspartic acid, phenylalanine and cystine are unsuitable for use in the sweetener compositions because each of these amino acids is insoluble in glycerol at the heating temperatures specified herein. Proline and lysine, while soluble in glycerol, are not adapted for use in the sweetener compositions because the presence of these amino acids results in products having an unsuitable taste.

UNITARY SOLUBILIZATION PROCEDURE

In an alternative procedure to that hereinabove described, the sweetener composition can be prepared by heating and stirring a mixture of glycerol, glycine and gum arabic at a temperature from about 90° to about 115° C. and, preferably, at a temperature from about 93° to about 110° C. to obtain a solution of the same.

EXAMPLE IV

A series of 100 gram batches of sweetener composition were prepared with each sweetener composition containing 96 grams of glycerol, 1.0 gram of glycine, and 3.0 grams of gum arabic. Each composition was prepared in the following manner. One (1) gram of glycine and 3.0 grams of gum arabic were admixed with 96 grams of glycerol to form a suspension which, with continuous stirring, was heated (in a glycerol bath) to and maintained at a temperature between 93° and 97° C. for about 5 to 10 minutes to effect solubilization of the glycine and gum arabic in the glycerol, whereupon heating and discontinued. The sweetener compositions prepared by the unitary solubilization procedure had taste characteristics substantially the same as the sweetener compositions prepared by the multi-step procedure described hereinabove.

Each of the sweetener compositions in Examples 4a and 4b contain 96 grams of glycerol, 1.0 gram of glycine and 3.0 grams of gum arabic.

4a

This example illustrates a recipe for a cranberry sauce that incorporates the sweetener composition of this invention.

| INGREDIENTS | QUANTITY |
| --- | --- |
| Fresh Cranberries | 1 Pound |
| Sweetener Composition | ½ Cup |
| Water | ¼ Cup |
| Orange Pieces | ¼ Cup |

The cranberry sauce is prepared by heating all the ingredients in an open saucepan until the fluid boils; the saucepan is covered and heating is continued at a reduced level until the cranberries are cooked.

4b

This example illustrates a recipe for a vanilla frosting that incorporates the sweetener composition of this invention.

| INGREDIENTS | QUANTITY |
| --- | --- |
| Cream Cheese | 8 Ounces |
| Butter | ¼ Pound |
| Sweetener Composition | 5 Tablespoons |
| Vanilla Extract | 1 Teaspoon |

In view of the foregoing description and examples, it will become apparent to those of ordinary skill in the art that equivalent modification thereof may be made without departing from the spirit and scope of this invention.

That which is claimed is:

1. A sweetener composition comprising a solution of from about 92 to about 98 wt. % glycerol, from about 0.5 to about 3.0 wt. % glycine, and from about 1.5 to about 5.0 wt. % gum arabic made by heating the ingredients of said solution at a temperature from about 90° to about 115° C.

2. The composition of claim 1 wherein glycerol is present in an amount from about 95 to about 97 wt. %.

3. The composition of claim 1 wherein glycine is present in an amount from about 0.5 to about 1.5 wt. %.

4. The composition of claim 1 wherein gum arabic is present in an amount from about 2.0 to about 4.0 wt. %.

5. The composition of claim 1 wherein glycerol is present in an amount from about 95 to about 97 wt. %, glycine is present in an amount from about 0.5 to about 1.5 wt. %, and gum arabic is present in an amount from about 2.0 to about 4.0 wt. %.

6. A method for preparing a sweetener composition, which comprises:
heating and stirring a mixture containing from about 92 to about 98 wt. % glycerol, from about 0.5 to about 3.0 wt. % glycine, and from about 1.5 to about 5.0 wt. % gum arabic at a temperature from about 90° to about 115° C. to obtain a solution of said glycine and said gum arabic in said glycerol.

7. The method of claim 6 wherein the mixture of glycerol, glycine and gum arabic is heated at a temperature from about 93° to about 110° C. to obtain a solution thereof.

8. The method of claim 6 wherein the concentration of glycerol in the mixture is from about 95 to about 97 wt. %.

9. The method of claim 6 wherein the concentration of glycine in the mixture is from about 0.5 to about 1.5 wt. %.

10. The method of claim 6 wherein the concentration of gum arabic in the mixture is from about 2.0 to about 4.0 wt. %.

11. The method of claim 6 wherein the mixture contains from about 95 to about 97 wt. % glycerol, from about 0.5 to about 1.5 wt. % glycine and from about 2.0 to about 4.0 wt. % gum arabic.

12. The method of claim 11 wherein the mixture of glycerol, glycine and gum arabic is heated at a temperature from about 93° to about 110° C. to obtain a solution thereof.

* * * * *